Dec. 8, 1925. 1,564,715
G. RUSSELL
JOINTING AND FASTENING MEANS
Filed Dec. 3, 1924
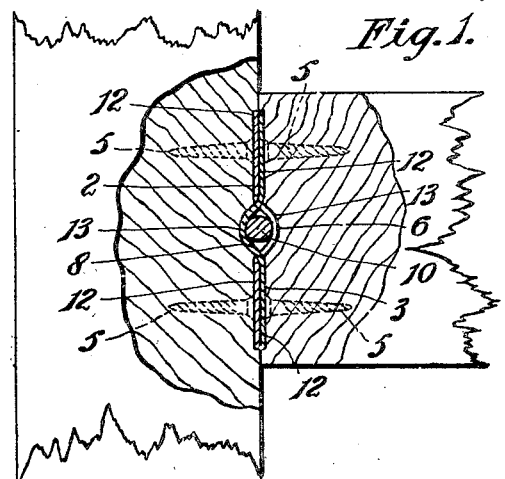
Fig.1.
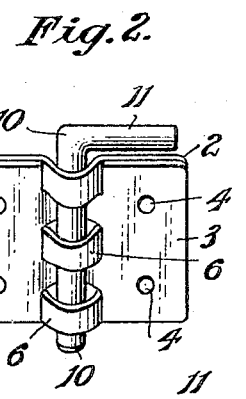
Fig.2.
Fig.5.
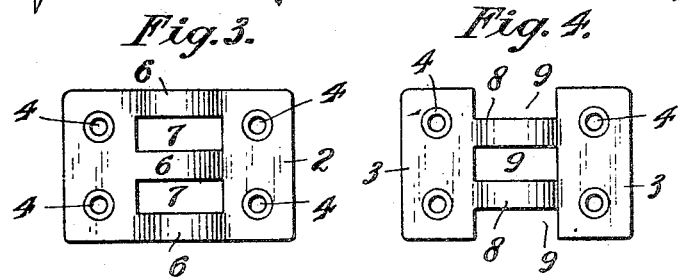
Fig.3. Fig.4.
Fig.6.
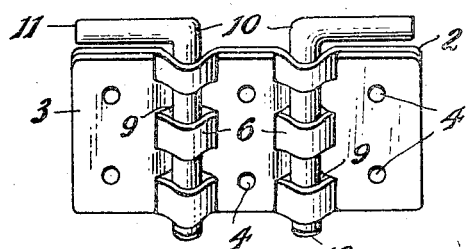
Fig.7.
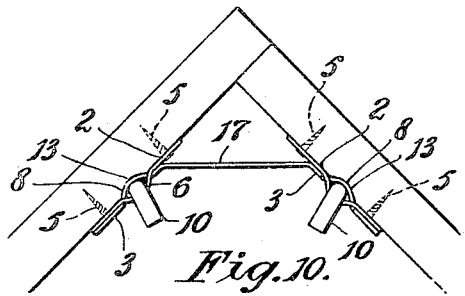
Fig.10.
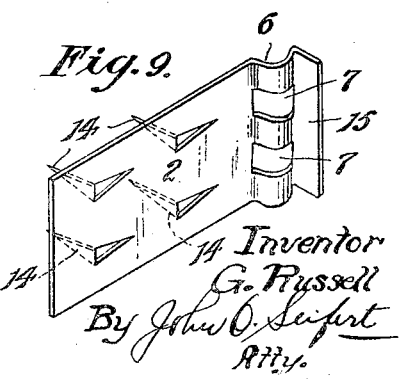
Fig.9.
Fig.8.
Inventor
G. Russell
By John O. Seifert
Atty.

Patented Dec. 8, 1925.

1,564,715

UNITED STATES PATENT OFFICE.

GARRETT RUSSELL, OF ELSTERNWICK, VICTORIA, AUSTRALIA, ASSIGNOR OF ONE-HALF TO HAROLD JAMES TULLY, OF MELBOURNE, AUSTRALIA.

JOINTING AND FASTENING MEANS.

Application filed December 3, 1924. Serial No. 753,590.

*To all whom it may concern:*

Be it known that I, GARRETT RUSSELL, a subject of the King of Great Britain, residing at Elsternwick, in the State of Victoria, Commonwealth of Australia, have invented new and useful Improvements in Jointing and Fastening Means, of which the following is a specification.

This invention relates to an improved jointing device for rigidly fastening members or constructional integers in such a manner as will provide for their ready disconnection when necessary, and it is particularly adapted for use in jointing the wooden members of bedsteads, tables, chairs and other articles of furniture: for fastening the sides and ends of packing cases and crates: for connecting the members of scaffolding and of moulds used in concrete construction and for other analogous purposes.

The invention although primarily devised for jointing wooden members is not limited to that use, as it can be applied with equal facility for the functioning of metal members, but more particularly in metal constructions wherein the provision of means permitting the ready assembly and disconnection of parts is the desideratum.

According to the invention, I provide a jointing device comprising two small plates having members adapted to be interfitted and then locked by a detachable pin or key. Each of the aforesaid plates is constructed having loops in the nature of arch-shaped projections with slots between said loops, and the slots of the one plate are arranged to accommodate the loops of the opposed plate when the two plates are placed in abutment. A locking pin or key inserted through the registering loops rigidly retains the two plates in interlocked engagement.

Reference is had to the accompanying drawings, wherein:—

Figure 1 is a part sectional view showing two members of an article of furniture rigidly but detachably fastened together by a jointing device according to the invention.

Figure 2 is a perspective view of the improved jointing device showing the two plates interlocked.

Figures 3 and 4 show in elevation the two plates detached.

Figures 5 and 6 are views of one form of a locking pin or key for the interfitting plates of the jointing device.

Figure 7 is a perspective view of another form of the invention characterized by having each of the plates formed with two series of loops and locked in interfitting engagement by two pins.

Figure 8 is a view illustrating a further form of the invention for effecting a corner joint.

Figure 9 is a view showing one of the members of the jointing device constructed with tongues for attachment purposes in lieu of screw fastenings.

Figure 10 is a plan view illustrating an adaptation of the invention for the dual purpose of jointing and corner bracing.

The improved jointing device in the representative form of the invention illustrated in Figures 1 to 6 comprises two plates 2 and 3 having holes 4, through which screws 5 are passed to affix said plates in required relative positions to the members that are to be jointed.

The plate 2 is constructed having three loops or arched projections 6 corresponding dimensionally and arranged in alignment, and between said loops there are formed slots 7 in said plate.

The co-operating plate 3 of the jointing device is constructed with two loops or arched straps 8 corresponding dimensionally and in aligned arrangement and having a central and two margial slots 9.

The slots 7 and 9 have a width slightly exceeding that of the loops 8 and 6, respectively. The two plates are adapted to be brought into surface abutment, when the loops 6 of the plate 2 register with and project through the slots 9 of the plate 3, while the loops 8 of the plate 3 register with and project through the slots 7 of the opposed plate 2.

A locking pin or key 10 having its stem of oval or elliptical shape in cross-section and provided with an arm 11 at its upper end is then passed through the series of loops 6 and 8 and by being slightly turned is caused to impinge with required pressure against the surfaces of said loops to thus maintain the two opposed plates in interlocked engagement. Other forms of locking pins may be used, or alternatively a key constructed to form a driving fit with the said loops 6 and 8 may be provided, but for facility of assembly and disconnection I prefer to employ a locking pin as hereinbefore described.

In applying the invention to the members of articles of furniture to be jointed, as shown in Figure 1, shallow recesses 12 and transverse grooves 13 are first formed in the relative ends of each of the said members. The recesses 12 provide seatings for the plates 2 and 3 which are secured in position by the screws 5, while the transverse grooves 13 accommodate the curved loops 6 and 8, thus enabling a specially neat and an almost concealed joint to be effected, as the only integer that is visible is the arm 11 of the locking pin. This locking pin by being turned slightly in required direction can be conveniently withdrawn by being pulled outwardly, when immediate disconnection of the jointed members can be conveniently and very readily effected.

Figure 7 illustrates a form of the improved jointing device suitable for effecting joints required to be particularly strong and rigid, such as, for example, the joints of bedstead frames, scaffolding or the like. Each of the plates 2 and 3 of the device is constructed having two series of loops 6 and 8 in parallel rows with slots 7 and 9 formed in said plates between said loops, and two detachable locking pins or keys 10 are employed to rigidly maintain the two plates in interfitted position.

A device according to the invention for effecting a corner joint is illustrated in Figure 8—such jointing device being particularly suitable for detachably fastening the sides and ends of packing cases, crates and similar articles. The plates 2 and 3 in this embodiment are adapted to be secured to the interior surfaces of the case or crate parts at their junctioning ends by screws 5, or alternatively, by tongues 14 that are pressed outwardly from said plates to function as fastening spikes—see Figure 9. Each of the plates is constructed with an end member or flange 15, that is bent at right angles to conform to the corner, and having loops and intervening slots to co-register for the interfitting of said plates, which are detachably locked together by a pin or key 10 in the manner hereinbefore described. One of the said plates of the jointing device is off-set as indicated at 16 to fit snugly over the end portion of the opposed plate and thus form a specially neat and rigid joint.

Figure 10 illustrates an embodiment of the invention for detachably jointing a side and an end of a packing case, a crate or like receptacle and at the same time bracing the corner so jointed. Two plates 2 having their loops 6 to project interiorly of the receptacle are secured by screws 5 or equivalent fastenings, one to each of the case or crate members to be jointed, and a brace 17 is provided having at its opposite ends plates 3 that are set angularly to said brace to conform to the corner and adapted to be brought into surface abutment with the aforesaid plates 2. These end plates 3 have slots to accommodate the loops 6 of the fixed plates 2 and loops 8 to project through the slots of said fixed plates, said loops 8 being seated in grooves 13 that are formed in the inner surfaces of the case or crate members. The brace is detachably fastened and the case or crate members are jointed by two pins or keys 10, that are passed through the loops 6 and 8 of the plates 2 and 3, respectively, in the manner before described.

The two co-operating plates of the jointing device having loops and intervening slots to facilitate an interfitting engagement of such parts are preferably constructed of sheet metal by the use of dies in metal stamping operations for accuracy and economy in production.

It is to be understood that the number of aligned loops or rows of loops formed on the interfitting plates 2 and 3 may be subject to variations according to the uses to which the jointing device is to be applied, and the number and arrangement of slots to receive said loops will be varied accordingly.

The device enables a specially rigid joint to be readily effected, while permitting members so jointed to be conveniently detached, principally for the purpose of economizing space in transport and storage.

What I do claim is:—

1. An improved jointing device comprising two interfitting plates, slots formed in said plates at intermediate points, projecting loops on said plates to fit through said slots, and a pin adapted to be inserted through the loops of both of the plates to detachably lock the plates in surface abutment.

2. An improved jointing device according to claim 1 wherein the locking pin is of elliptical shape.

3. An improved jointing device comprising two interfitting plates, slots formed in said plates at intermediate points, semi-circular loops formed intermediately on said plates to fit through said slots, and a locking pin adapted to be inserted between said semi-circular loops to detachably lock the plates in surface abutment.

In testimony whereof I affix my signature.

GARRETT RUSSELL.